United States Patent
Myers et al.

(10) Patent No.: US 10,006,409 B2
(45) Date of Patent: Jun. 26, 2018

(54) LOCOMOTIVE ON-BOARD STORAGE AND DELIVERY OF GASEOUS FUEL

(71) Applicant: Optifuel Systems, LLC, Beaufort, SC (US)

(72) Inventors: Scott Myers, Beaufort, SC (US); David Wilkerson, Greenville, SC (US); Brian McDonald, Simpsonville, SC (US)

(73) Assignee: Optifuel Systems, LLC, Beaufort, SC (US)

( * ) Notice: Subject to any disclaimer, the term of this patent is extended or adjusted under 35 U.S.C. 154(b) by 0 days. days.

(21) Appl. No.: 15/358,983

(22) Filed: Nov. 22, 2016

(65) Prior Publication Data

US 2017/0145961 A1    May 25, 2017

Related U.S. Application Data

(60) Provisional application No. 62/258,699, filed on Nov. 23, 2015.

(51) Int. Cl.
*F02M 21/02* (2006.01)
*B61C 5/00* (2006.01)
(Continued)

(52) U.S. Cl.
CPC ............ *F02M 21/029* (2013.01); *B61C 5/00* (2013.01); *B61C 17/00* (2013.01); *B61D 17/00* (2013.01);
(Continued)

(58) Field of Classification Search
CPC ............ F02M 21/029; F02M 21/0224; F02M 21/0296; B61C 5/00; B61C 17/00; B61D 17/00
(Continued)

(56) References Cited

U.S. PATENT DOCUMENTS 5,129,328 A * 7/1992 Donnelly .................. B61C 5/00
105/26.05
6,086,103 A * 7/2000 Fukagawa .............. B60K 15/07
280/830
(Continued)

OTHER PUBLICATIONS

International Search Report and Written Opinion dated Mar. 21, 2017, for corresponding International PCT Application No. PCT/US2016/063338.

*Primary Examiner* — Thomas Moulis
*Assistant Examiner* — John Bailey
(74) *Attorney, Agent, or Firm* — Renner, Otto, Boisselle & Sklar, LLP

(57) ABSTRACT

A fuel deck for on-board storage and delivery of gaseous fuel for a locomotive. The fuel deck is formed between the engine deck and the trucks of the locomotive. The fuel deck includes a base for riding on the trucks, a ceiling configured to separate the fuel deck from the engine deck, and one or more support structures extending between the base and the ceiling. The support structures are configured to support the load from the engine deck, and separate the base from the ceiling to form a fuel storage compartment that is adapted to store one or more fuel tanks that contain the gaseous fuel. A fuel system including one or more fuel tanks is also provided, where each fuel tank may have more than one inlet/outlet port for enabling faster refilling or distribution of the gaseous fuel, among other considerations.

16 Claims, 11 Drawing Sheets

(51) Int. Cl.
*B61C 17/00* (2006.01)
*B61D 17/00* (2006.01)

(52) U.S. Cl.
CPC .... *F02M 21/0224* (2013.01); *F02M 21/0296* (2013.01)

(58) Field of Classification Search
USPC ....... 105/36, 61.5, 62.1, 62.2, 47, 85, 158.1, 105/407, 404, 400, 399, 397, 396, 393, 105/353, 330, 329.1; 137/345, 346; 454/85, 86, 93
See application file for complete search history.

(56) References Cited

U.S. PATENT DOCUMENTS

| | | | | |
|---|---|---|---|---|
| 7,565,867 B2* | 7/2009 | Donnelly | | B60L 9/22 105/26.05 |
| 7,757,726 B2* | 7/2010 | Handa | | F17C 1/00 141/18 |
| 7,966,945 B1* | 6/2011 | Miller | | B61C 7/04 105/35 |
| 8,925,465 B2* | 1/2015 | Foege | | B61C 17/02 104/287 |
| 9,580,083 B2* | 2/2017 | Steindorff | | B60K 15/03 |
| 9,624,871 B2* | 4/2017 | Melanson | | F17C 5/06 |
| 9,630,633 B2* | 4/2017 | Pykkonen | | B60L 11/02 |
| 2005/0145223 A1* | 7/2005 | Nozaki | | F02D 33/006 123/516 |
| 2008/0223251 A1* | 9/2008 | Bendig | | B61C 5/00 105/133 |
| 2009/0101041 A1* | 4/2009 | Burns | | B61C 5/00 105/35 |
| 2012/0085260 A1* | 4/2012 | Nichini | | B61O 5/00 105/35 |
| 2013/0152818 A1* | 6/2013 | Holl | | B61O 5/04 105/62.1 |
| 2013/0239845 A1* | 9/2013 | Frazier | | B61C 3/00 105/27 |
| 2014/0033738 A1 | 2/2014 | Billig et al. | | |
| 2014/0033942 A1* | 2/2014 | Foege | | B61C 17/02 105/1.4 |
| 2014/0033943 A1* | 2/2014 | Foege | | B61C 5/00 105/1.4 |
| 2014/0033946 A1* | 2/2014 | Billig | | F17C 7/00 105/35 |
| 2014/0150753 A1* | 6/2014 | Foege | | F02M 33/02 123/525 |
| 2014/0157780 A1* | 6/2014 | Stratton | | F02C 7/222 60/739 |
| 2014/0157784 A1* | 6/2014 | Stratton | | F02C 9/26 60/752 |
| 2014/0261073 A1* | 9/2014 | Cook | | F01N 3/20 105/392.5 |
| 2014/0379182 A1* | 12/2014 | Frazier | | B61C 3/00 701/19 |
| 2015/0096977 A1* | 4/2015 | Sirosh | | F02M 21/0221 220/4.14 |
| 2015/0120166 A1* | 4/2015 | Fisher | | B61C 17/02 701/101 |
| 2016/0001799 A1* | 1/2016 | Cook | | B61H 11/00 105/35 |
| 2016/0167677 A1* | 6/2016 | Schaefer, Jr. | | B61C 17/06 105/35 |
| 2016/0230687 A1* | 8/2016 | Takeuchi | | F02D 41/0027 |
| 2016/0290258 A1* | 10/2016 | Foege | | F02D 19/12 |
| 2016/0297451 A1* | 10/2016 | Schwab | | B61C 5/00 |

\* cited by examiner

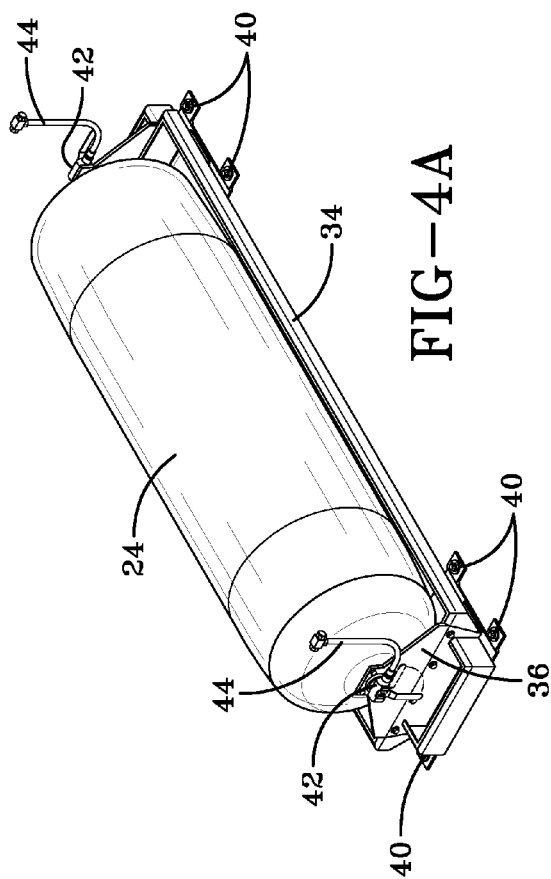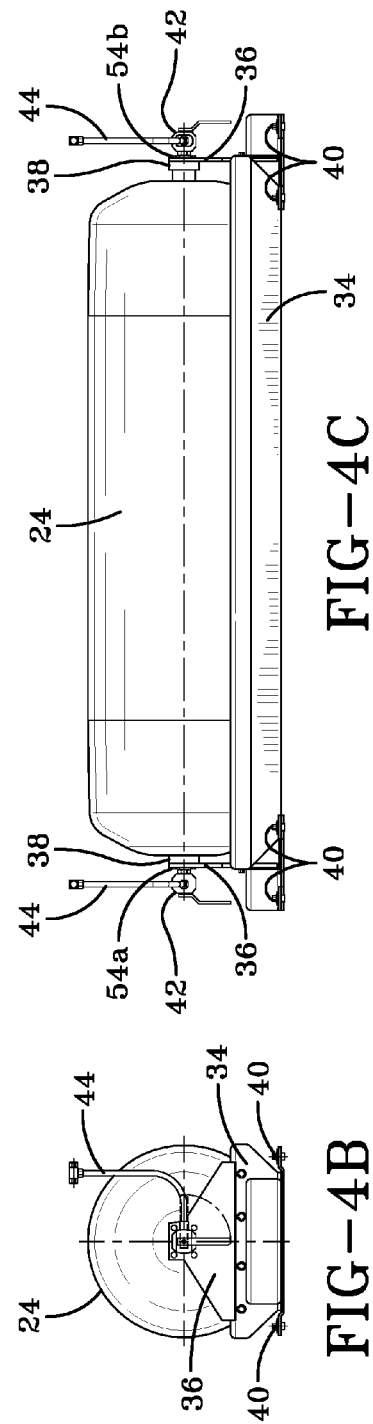

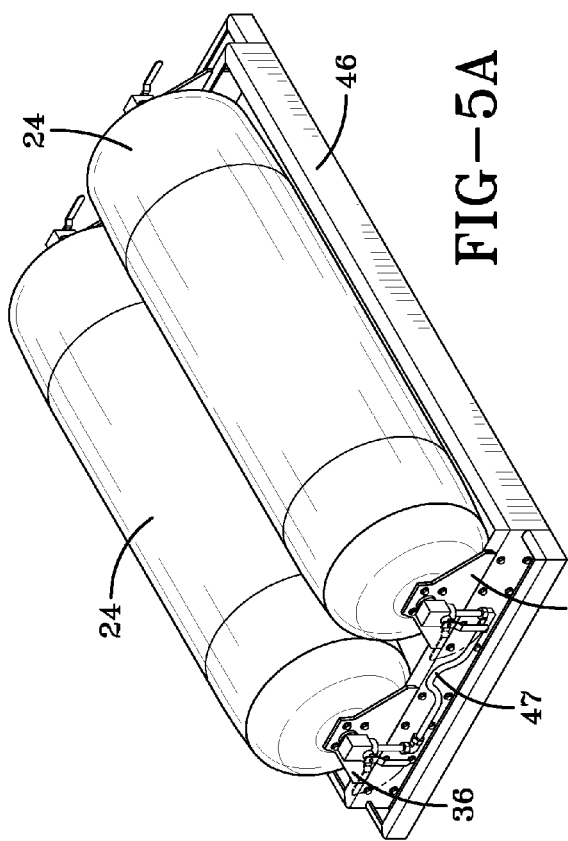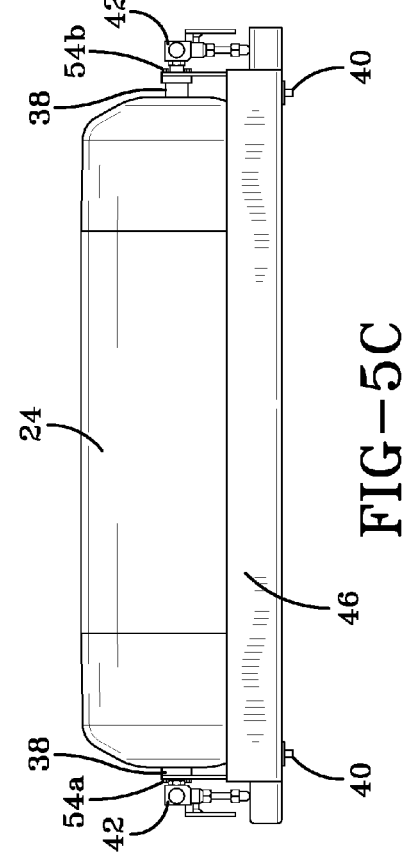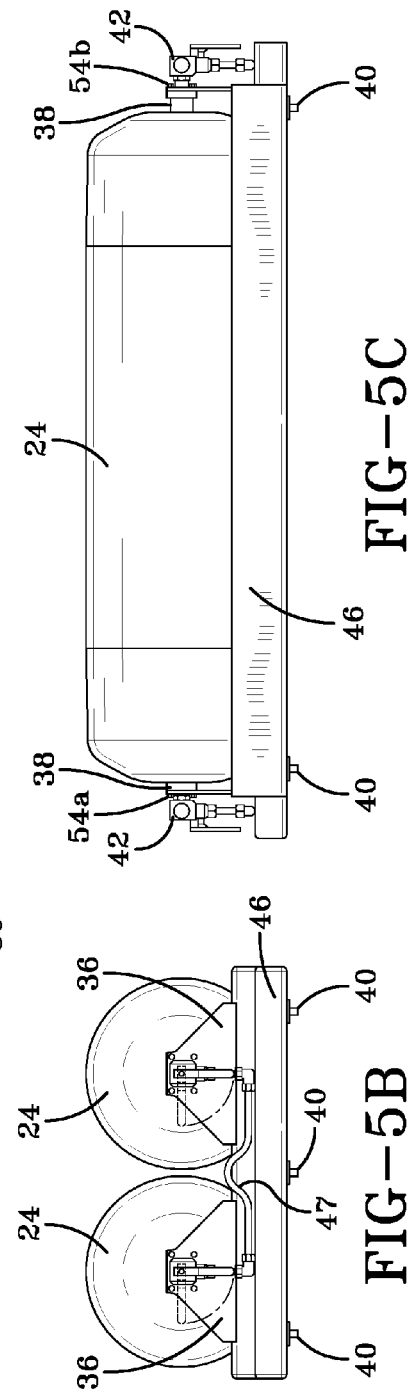

LOCOMOTIVE ON-BOARD STORAGE AND DELIVERY OF GASEOUS FUEL

RELATED APPLICATIONS

This application claims the benefit of U.S. Provisional Application No. 62/258,699 filed Nov. 23, 2015, which is hereby incorporated herein by reference in its entirety.

FIELD OF INVENTION

The present invention relates generally to locomotives, and more particularly to on-board storage and delivery of gaseous fuel for a locomotive.

BACKGROUND

A growing trend is to power locomotives with less expensive, cleaner burning gaseous fuels, such as natural gas. However, even though locomotives are large vehicles, they typically have limited space available for the storage of such gaseous fuels due to the placement of various on-board power equipment, such as the engine, electrical generator, and the like. This situation is exacerbated with gaseous fuels such as natural gas, because even when stored as a cryogenic liquid, such fuels have substantially lower energy density than liquid fuels, such as diesel. Thus, these gaseous fuels (e.g., natural gas) typically require much larger storage tanks than liquid fuels (e.g., diesel) in order to produce the same refueling range. In addition, in systems where the alternative gaseous fuel is designed to burn in combination with the existing liquid fuel, then storage tanks for both fuels must be accommodated in the already-constrained space.

In order to improve the energy density of gaseous fuels, the gaseous fuel is commonly compressed for storage, often to pressures of several thousand pounds per square inch. Thus, the storage tanks containing these fuels are typically structurally reinforced pressure vessels, and the fuel lines and valves that deliver the fuel are typically exposed to this elevated tank pressure. In addition, the locomotive may experience significant shock and vibratory loading due to its operating environment, and may also experience significant environmental fluctuations, such as extreme changes in temperature. As such, the system for securing the fuel tanks and fuel delivery system should be able to withstand such loading and environmental variations over the multi-decade life of the locomotive. Also due to these severe operating conditions, the storage tanks, fuel lines, and other components are usually governed by regulations that mandate regular inspection and maintenance. However, in a complex, multi-tank, multi-line system, the ability to conveniently and thoroughly inspect such components is often hindered by difficult access to the components.

One known method for facilitating the storage and delivery of gaseous fuels includes the use of "tender cars," which carry the gaseous fuel supply in a separate train car that forms part of the train consist. The tender car is typically located adjacent to the locomotive and is fluidly connected to the locomotive for supplying gaseous fuel to the engine. However, in the United States, current regulations require that the storage of all liquid and/or gaseous fuels must be on-board the locomotive during operation, and thus current regulations prohibit the use of such tender cars. Even if such regulations were changed to permit tender cars, the tender cars present significant logistical problems for the operator, in that, one or more of these additional tender cars must always be coupled to the locomotive during transit. In many short line, switching and industrial locomotive operations, the train length is at a premium, and the addition of another rail car within the train consist solely for the purpose of locomotive fuel supply may significantly inhibit effective operation of the rail line.

SUMMARY OF INVENTION

While gaseous fuel may provide advantages in fuel cost and/or emissions reductions for locomotives, such alternative fuel presents significant challenges in fuel storage and efficiency in refueling operations due to the significantly lower energy density of the gaseous fuel.

According to one aspect of the invention, improvements are provided in the storage and delivery of gaseous fuel for a locomotive.

For example, according to one aspect of the invention, a fuel deck may be provided that enables on-board storage of the gaseous fuel.

The fuel deck may form a part of the locomotive, and may be installed between the engine deck and the trucks of the locomotive.

More particularly, the fuel deck may separate the engine deck from the locomotive trucks to form a fuel storage compartment therebetween. The fuel storage compartment may be adapted to store one or more fuel tanks containing the gaseous fuel.

The fuel deck may be configured to support all of the load of the engine deck, and may be configured to distribute and transfer the load from the engine deck to the trucks during operation of the locomotive.

The fuel deck may provide such on-board storage and delivery of gaseous fuel while enabling convenient installation, locating and securing of the storage tanks for long-term operation in high-vibration and transient environments, while also enhancing the ease of inspection and maintenance of the fuel system.

Further provisions may be provided in the fuel deck to enhance venting of leaked gas to the atmosphere, to prevent leaked gas from entering the engine deck, and/or for taking measures when leaked gas is detected.

According to an aspect of the invention, a fuel deck is provided for on-board storage and delivery of gaseous fuel for a locomotive, the locomotive having one or more trucks and an engine deck containing one or more engines powered by the gaseous fuel, the fuel deck configured to be interposed between the engine deck and the one or more trucks, where the fuel deck includes a base configured to ride on the one or more trucks; a ceiling opposing the base and configured to separate the fuel deck from the engine deck; and at least one support structure extending between the base and the ceiling; where the at least one support structure is configured to support load from the engine deck; and where the at least one support structure is configured to separate the base from the ceiling to form a fuel storage compartment that is adapted to store one or more storage tanks for storing the gaseous fuel.

According to another aspect of the invention, a method of forming a fuel deck includes: (i) disposing a base on at least two trucks, such that the base extends longitudinally across the at least two trucks; (ii) mounting at least one support structure to the base, such that the at least one support structure extends upright from the base and forms at least one fuel storage bay; (iii) disposing at least one fuel tank for storing gaseous fuel in the at least one fuel storage bay; (iv) disposing an engine deck on the at least one support structure, the engine deck configured to contain one or more engines for being powered by the gaseous fuel, wherein the at least one support structure is configured to carry the load of the engine deck; and (v) mounting fuel conduits for fluidly connecting the at least one fuel tank to the one or more engines.

According to another aspect of the invention, a fuel system for a locomotive powered by gaseous fuel is provided.

The fuel system may include one or more storage tanks for containing the gaseous fuel, and each of the storage tanks may have more than one inlet/outlet port for refilling or distributing the gaseous fuel. For example, each storage tank may have an inlet/outlet port at each end portion thereof that enables the storage tank to be simultaneously fillable from both ends, or to be independently fillable from either end.

Such a fuel system may enable faster refueling times of the storage tanks containing the gaseous fuel, or may enhance the accessibility of the storage tanks for refueling from one side or the other.

More particularly, according to an aspect of the invention, a fuel system is provided for supplying fuel to a locomotive having at least one engine powered by gaseous fuel, where the fuel system includes at least one fuel storage tank for storing the gaseous fuel; and a plurality of fluid conduits for delivering the gaseous fuel from the at least one fuel storage tank to the at least one engine; wherein the at least one fuel storage tank has a first end portion having a first inlet/outlet port, and a second opposite end portion having a second inlet/outlet port; and wherein the plurality of fluid conduits are configured to fluidly connect both the first inlet/outlet port and the second/inlet outlet port for enabling simultaneous filling or discharge of the gaseous fuel.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIGS. 4A-4C show a fuel tank disposed in an exemplary cradle according to an embodiment of the invention.

FIGS. 5A-5C show fuel tanks disposed in another exemplary cradle according to another embodiment of the invention.

DETAILED DESCRIPTION

The principles and aspects of the present invention have particular application to locomotives powered by gaseous fuel, including engines operating on a single fuel or a combination of fuels, such as compressed natural gas (CNG) alone, or which may be used in combination with diesel fuel and/or which may be used in conjunction with an electrical generator, and thus will be described below chiefly in this context. It is understood, however, that the principles and aspects of this invention may be applicable to other systems that use other low-energy-dense fuels, such as other gaseous fuels, particularly where it is desirable to provide on-board storage and delivery of the fuel, which may enable convenient installation and securing of the fuel storage tanks, while enhancing the ease of inspection and maintenance of the fuel system; and/or where it is desirable to provide a fuel system that may enable faster refueling times, or may enhance the accessibility of the fuel storage tanks, among other considerations.

Figure 1:
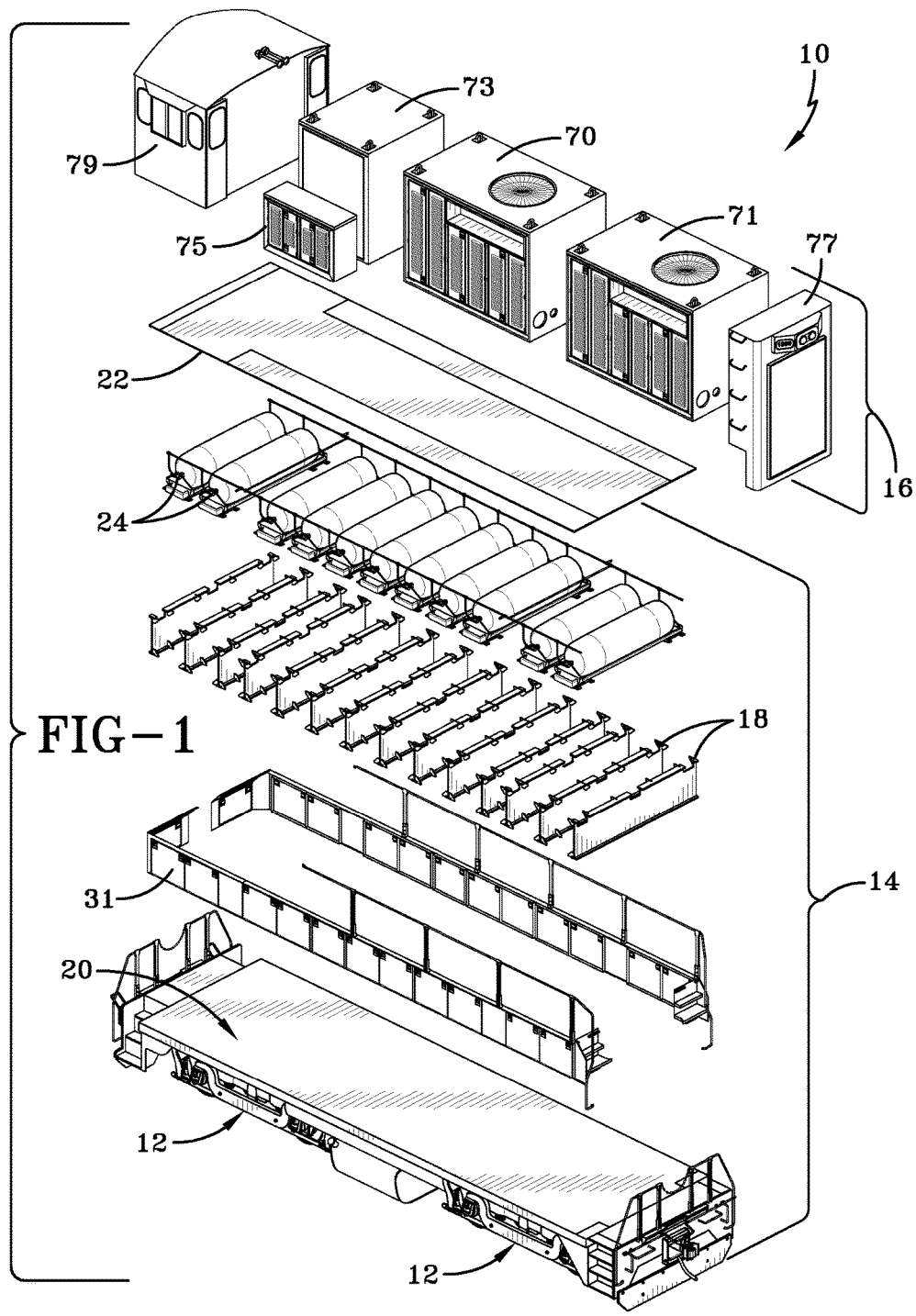
FIG. 1 is a partially exploded perspective view of an exemplary locomotive having an exemplary fuel deck according to an embodiment of the invention.

Referring to FIG. 1, an exemplary locomotive 10 is shown in partially exploded perspective view. The locomotive 10 includes one or more trucks 12 for riding on railroad tracks, an exemplary fuel deck 14 for storage and delivery of gaseous fuel, and an engine deck 16 having at least one engine powered by the gaseous fuel. As shown in the illustrated embodiment, the exemplary fuel deck 14 is interposed between the trucks 12 and the engine deck 16, and includes one or more support structures 18 configured to support the load of the engine deck 16. The support structures 18 extend between a base 20 and a ceiling 22 of the fuel deck to form a fuel storage compartment, which is adapted to store one or more storage containers 24 that store the gaseous fuel.

Figure 2:
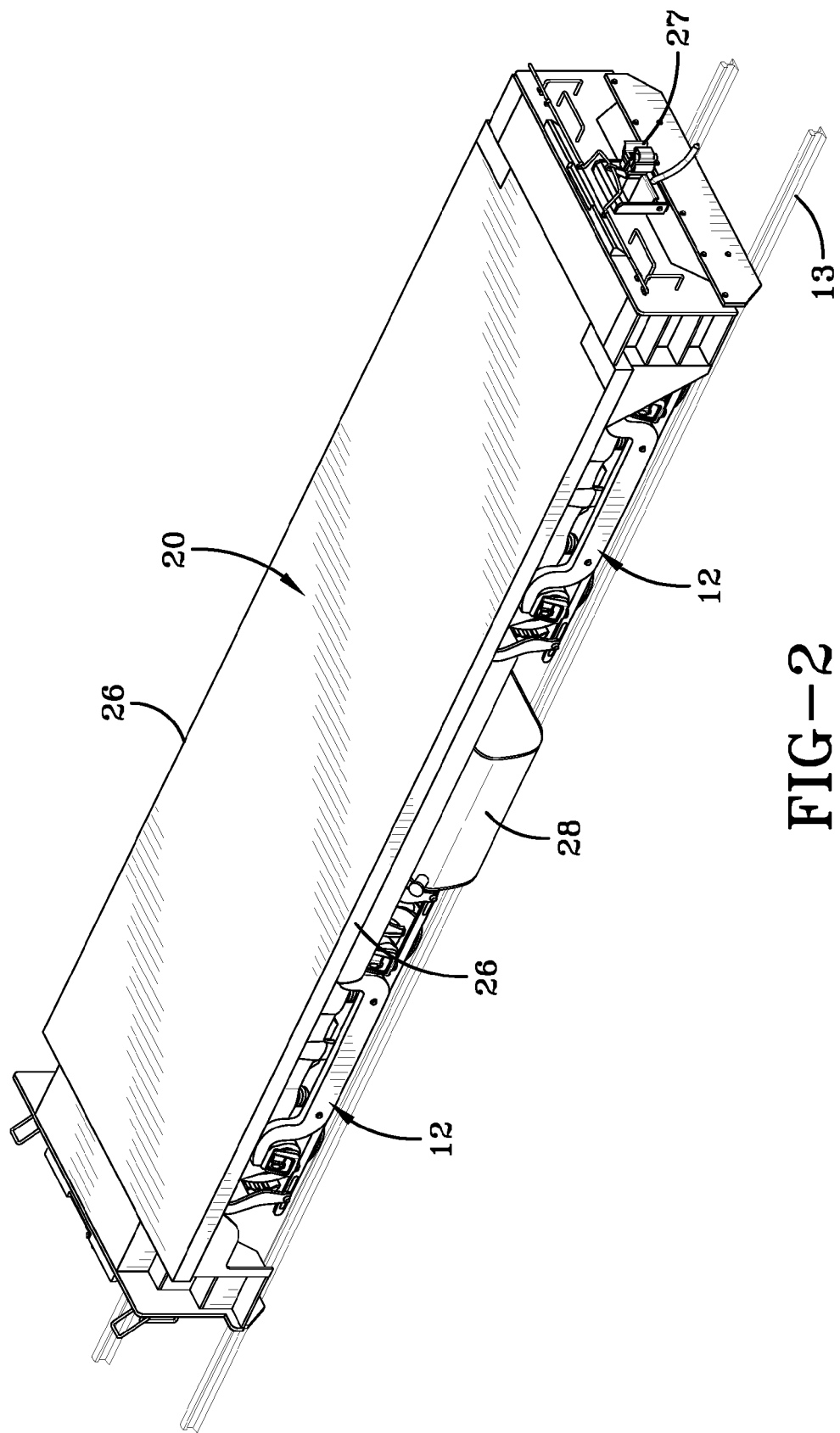
FIG. 2 is a perspective view of a portion of the locomotive in FIG. 1, with a base of the fuel deck disposed on trucks.

Turning to FIGS. 2-11, an exemplary method of forming the fuel deck 14 will be shown and described. Referring initially to FIG. 2, the trucks 12 are provided for riding on rails 13 of the track. As shown, each truck 12 may include an assembly of axles, wheels, traction motors, gearing, suspension, and brakes, which may be provided in a manner well-known in the art.

The base 20 is configured to ride on the trucks 12. As shown, the base 20 has laterals sides 26 and extends longitudinally between trucks 12. In some embodiments, the base 20 may form an undercarriage of the locomotive 10. In other embodiments, the base 20 may be mounted to a pre-existing undercarriage that is carried by the trucks 12. For example, the base 20 may be made of one or more steel plates having suitable thickness for withstanding load, and may be welded at suitable locations to the pre-existing undercarriage. As shown, the undercarriage may include railway couplings 27 for connecting to adjacent cars, and one or more liquid fuel containers 28, such as diesel tanks, may be mountable to the underside of the undercarriage between the one or more trucks 12.

Figure 3:
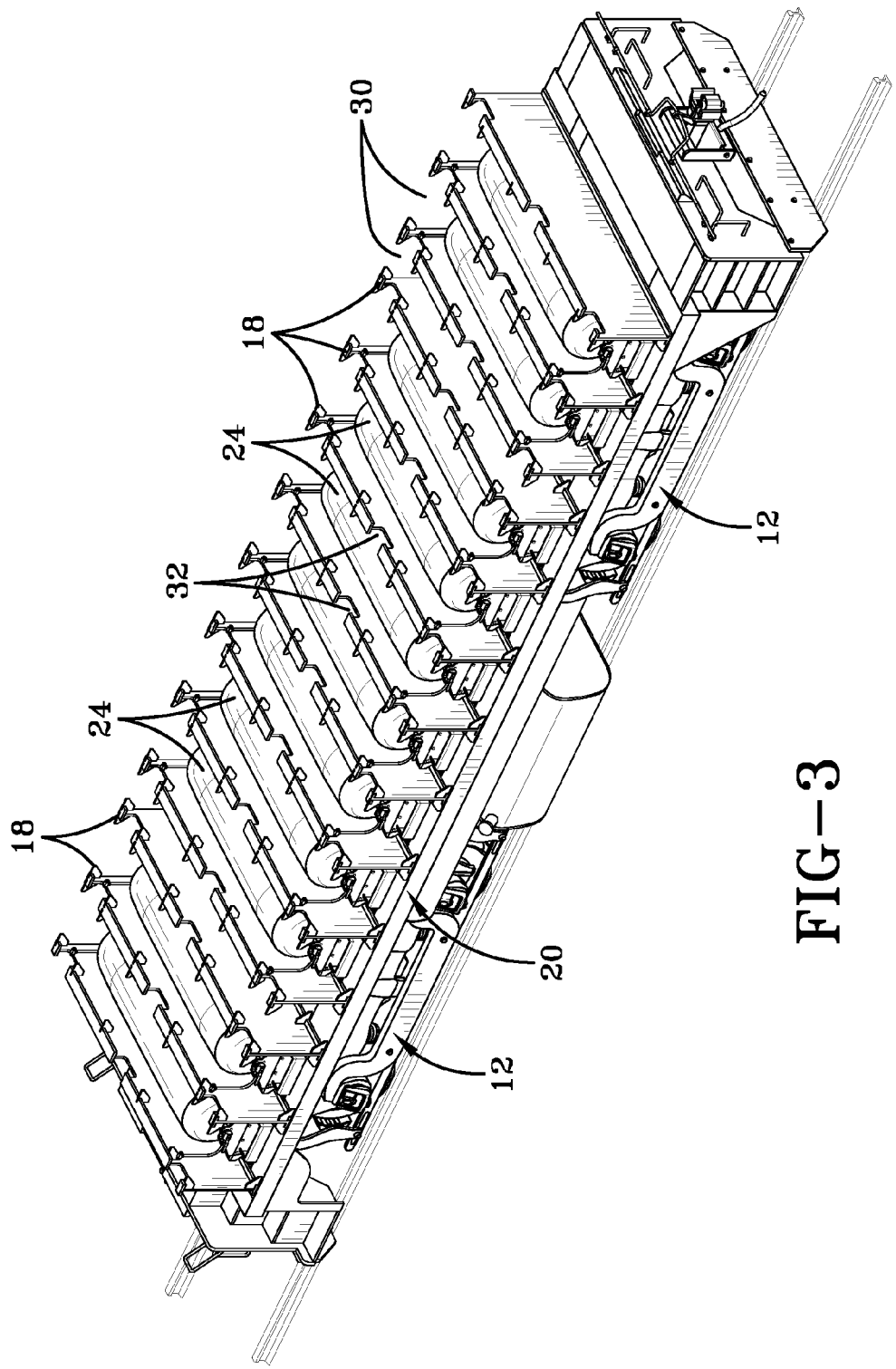
FIG. 3 is a perspective view of a portion of the locomotive in FIG. 2, with the addition of support structures and fuel storage tanks.

Referring to FIG. 3, the one or more supports structures 18 are mounted to the base 20. In the illustrated embodiment, a plurality of support structures 18 are provided, each of which extend upright from the base 20, and extend laterally across the base 20. The support structures 18 may be longitudinally spaced apart from each other along the base 20 to form one or more fuel storage bays 30 that open toward at least one lateral side of the base 20. Each of the fuel storage bays 30 may be adapted to provide sufficient longitudinal, lateral, and vertical spacing to receive one or more of the fuel storage tanks 24, and thus the fuel storage bays 30 form at least a portion of the overall fuel storage compartment provided by the fuel deck 14. Such a configuration of the laterally-opening storage bays 30 enables the fuel storage tanks 24 to be laterally disposed therein, which enables the inlet/outlet ports of the fuel tanks to face outwardly toward one or more lateral sides of the base 20. This may enable ease of access to the storage tanks 24, particularly to the plumbing or mounting portions, and may facilitate inspection, maintenance and/or replacement of storage tanks 24. In addition, removable access panels 31 (shown in FIGS. 1 and 11) may be provided for enclosing the ends of each fuel storage bay 30, while also facilitating ease of access to the storage tanks 24.

In exemplary embodiments, the support structures 18 may be configured as I-beams or other suitable structure(s) configured to support the load from the engine deck 16, and to distribute or transfer loads from the engine deck 16 to the base 20 and trucks 12 during transport. The support structures 18 may be welded to the base 20, or may be operatively coupled to the base in a suitable manner. As shown, some of the support structures 18 may be located close together so as to not form fuel storage bays 30 therebetween. It is understood that the number and location of the support structures 18 may be chosen as desired depending on overall load, load distribution, number of desired fuel tanks, among other considerations understood by those having skill in the art. It is also understood that although a plurality of support structures 18 is shown, the support structure may be configured as a unitary or sectional frame that extends along the base 20, such as in parallelepiped or angular form, provided that the support structure exhibits sufficient load bearing capability to support the engine deck 16 above.

In the illustrated embodiment, the support structures 18 are configured as walls that separate respective storage tanks 24. As shown, each support structure 18 may have one or more cut-outs 32 at an upper portion thereof. Such a configuration in which the storage bays 30 open toward the lateral sides 26, and in which each bay 30 communicates with an adjacent bay 30 via cut-outs 32, may enhance the venting capability of the fuel deck 14. This may reduce regions of the fuel deck where lighter-than-air fuel could become trapped and concentrated.

In exemplary embodiments, the support structures may be about 24-inches to 48-inches tall and may be spaced about 24-inches to 48-inches inches apart for receiving one fuel tank 24 per storage bay 30. Such a configuration of the support structures 18 may enable multiple, relatively small fuel tanks 24 to be provided, which may enhance modularity of the design for replacing such fuel tanks. It is understood, however, that although one fuel storage container 24 is shown in each fuel bay 30, that more than one fuel container 24 may be provided side-by-side and/or stacked on top of each other in each fuel bay 30, as desired. In addition, by minimizing the height of the fuel deck 14, the overall height of the locomotive 10 also may be maintained at a conventional level, or may be only moderately higher but still within regulation. Furthermore, by placing the fuel deck below the engine deck, and relatively low in the locomotive 10, the crash-worthiness of the fuel deck 14 may be enhanced.

Referring to FIGS. 4A-4C, each of the fuel storage containers 24 may be disposed in a cradle 34. The cradle 34 may be formed as a frame configured to carry and secure the fuel tank 24 in the fuel deck 14. Each fuel tank 24 may have a mounting boss 38 at each end portion thereof, and the cradle 34 may have mounts 36 configured to receive the corresponding fuel tank mounting bosses 38. The cradles 34 may be disposed within the fuel storage bays 30, and may be mounted to the base 20, or optionally may be mounted to the support structures 18 or ceiling 22. The cradles 34 may be mounted with damping members 40, such as isolation bearings or the like, which may be interposed between the cradle 34 and the base 20 (or other mounting interface) so as to reduce vibration on the fuel storage tanks 24 and associated fuel plumbing, or the like.

In some embodiments, the cradles 34 may be slidably disposed in each bay 30 for enabling the cradles 34 to slide laterally outwardly to facilitate inspection, maintenance, and/or replacement of the one or more storage tanks 24. For example, sliding rails may be mounted laterally to the base 20 or along the support structures 18 in each bay 30, and the cradles 24 may be slidably mounted to the sliding rails to enable such sliding movement.

Referring to FIGS. 5A-5C, another exemplary embodiment of a cradle 46 is shown. The cradle 46 is substantially similar to the cradle 34, except that two storage tanks 24 may be disposed in the cradle 46. The cradle 46 may have mounts 36 for receiving corresponding fuel tank mounting bosses 38. The cradle 46 also may be mounted with damping members 40, such as isolation bearings, or may be slidably mounted within the bays, as discussed above. A fuel conduit 47 may be provided with the cradle 46 for fluidly connecting the two fuel tanks 24 together.

Figure 6:
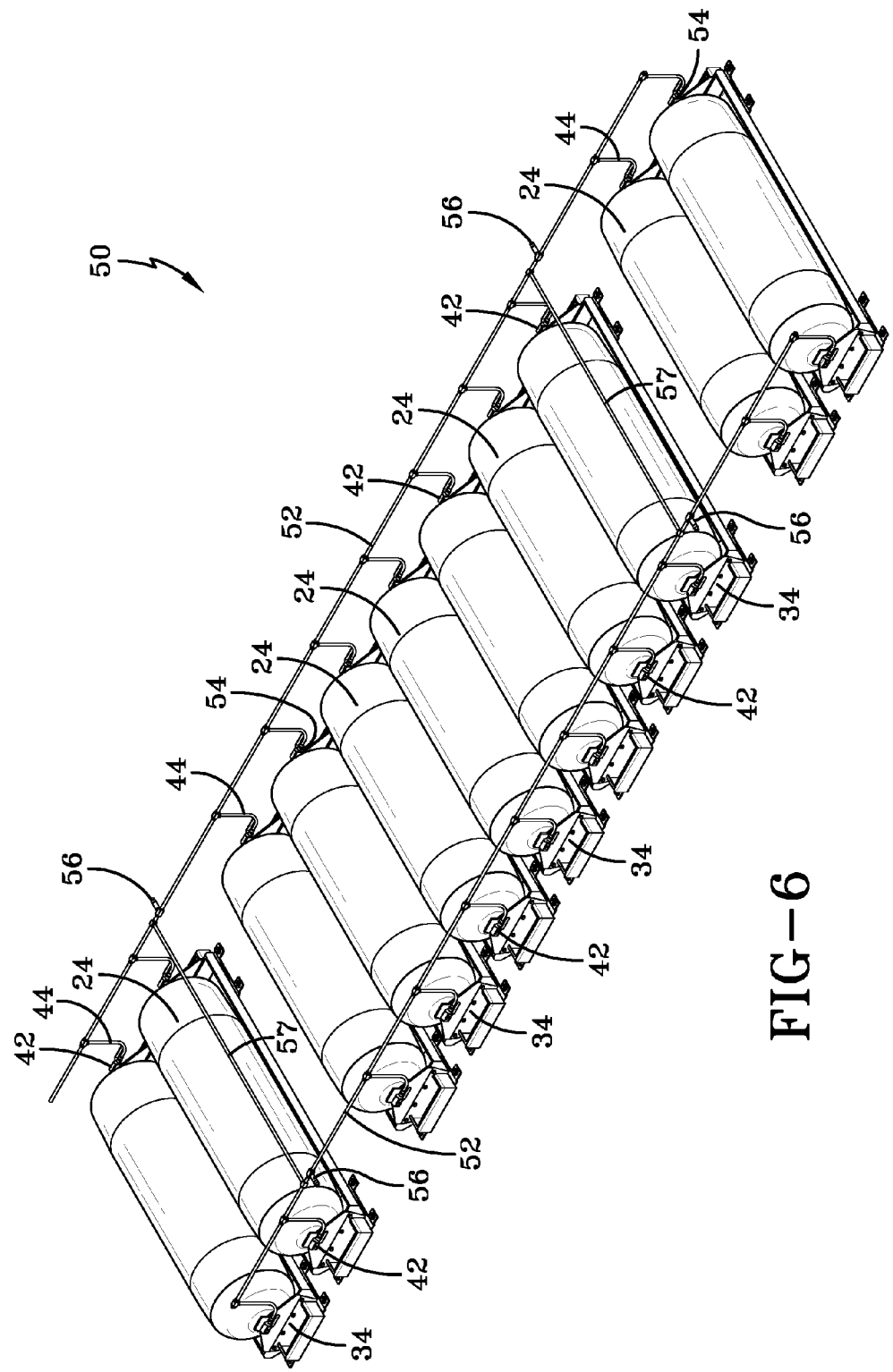
FIG. 6 is a schematic perspective view of an exemplary fuel system, including fuel storage tanks and fuel conduits, according to an embodiment of the invention.
Figure 7:
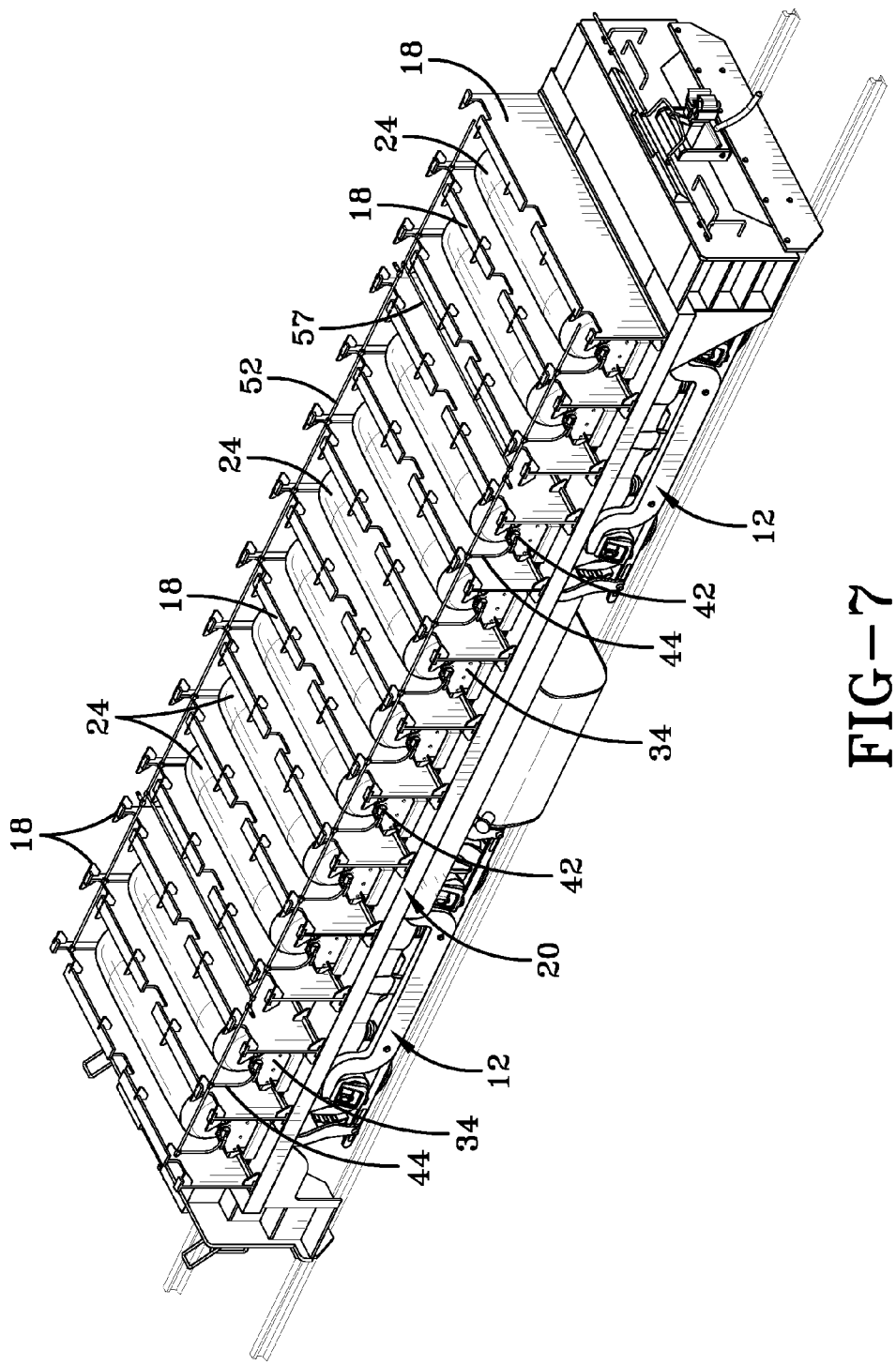
FIG. 7 is a perspective view of a portion of the locomotive in FIG. 3, with the addition of fuel conduits.

Referring to FIGS. 6 and 7, a fuel supply system 50 is provided for supplying the gaseous fuel from the storage tanks 24 to the at least one engine contained in the engine deck 16, or for refueling the storage tanks 24. As shown, the fuel supply system 50 may include rigid fuel conduits 52 and/or flexible fuel conduits 44. In exemplary embodiments, the rigid fuel conduits 52 may be fixedly mounted to the fuel deck ceiling 22 and/or the support members 18. The flexible fuel conduits 44 may fluidly connect the rigid conduits 52 to the fuel tanks 24, and valves 42 may be provided for connecting or disconnecting the conduits 44 to or from inlet/outlet ports of the fuel tanks 24. The flexible conduits 44 may be provided for enhancing damping capabilities and to better isolate the fuel line from shock and vibration loading. Optionally, the rigid conduits 50 and/or the flexible conduits 44 may be mounted to corresponding mounting interfaces with damping members, such as isolation bearings, to further reduce detrimental vibration effects.

As discussed above with reference to FIGS. 4A-7, the fuel storage tanks 24 each have an inlet/outlet port 54 at an end portion thereof, and each storage tank 24 may be laterally disposed in the fuel storage compartment, such as within bays 30, to enable the respective inlet/outlet ports 54 to face outwardly toward one or more lateral sides of the base 20. In exemplary embodiments, one or more of the storage tanks 24 may have at least two inlet/outlet ports, such as a first inlet/outlet port 54a at one end portion thereof, and a second inlet/outlet port 54b at a second opposite end portion thereof (referenced in FIGS. 4A-5C, for example). The fluid conduits 44 may fluidly connect to both the first inlet/outlet port 54a and the second/inlet outlet port 54b for enabling simultaneous filling or discharge of the gaseous fuel, which may enable the fuel tanks to be refilled or discharged faster. Optionally, the inlet/outlet ports 54a, 54b at each end may be used independently of each other, such as for filling the fuel tank 24 from one side when the opposite side is inaccessible.

Figure 8:
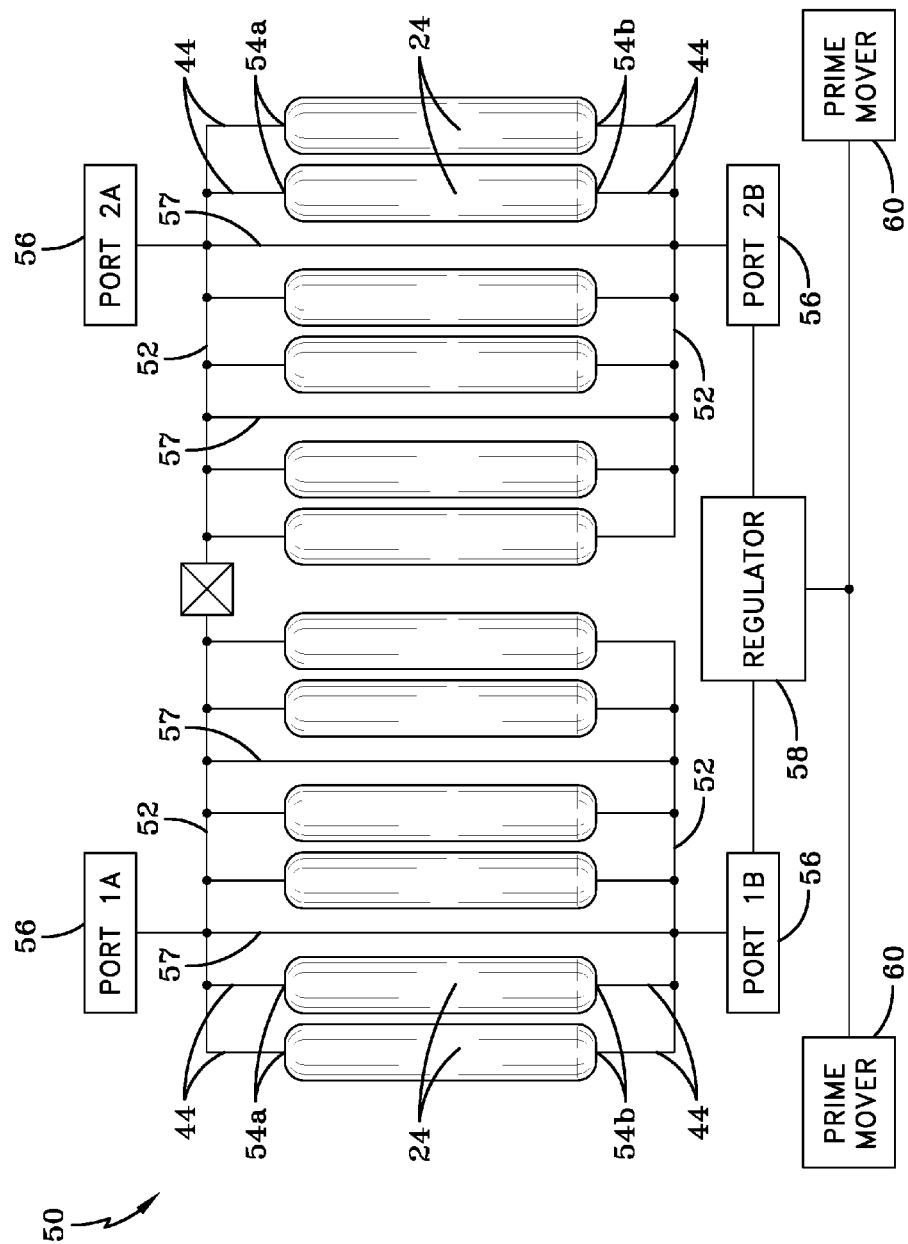
FIG. 8 is a schematic view of an exemplary fuel system according to an embodiment of the invention.

Referring to FIG. 8, a schematic diagram of the fuel supply system 50 is shown. In the illustrated embodiment, two fuel tanks 24 are disposed in each cradle 46, and the fuel conduits 44 fluidly connect the inlet/outlet ports 54a, 54b of the fuel tanks to the fuel conduits 52. As discussed above, suitable valves 42 may be used to fluidly connect or disconnect the conduits 44 to or from the fuel tanks 24. The fuel conduits 52 may have one or more inlet/outlet ports 56 (also shown in FIG. 6) for fluidly connecting the fuel tanks 24 to one or more prime movers 60, such as the engines that may be powered (at least partially) by the gaseous fuel contained in the fuel tanks 24. As shown, one or more of the conduit inlet/outlet ports 56 (shown as Port 1B and Port 2B) may be fluidly coupled to prime movers 60, and one or more other conduit inlet/outlet ports 56 (shown as Port 1A and Port 2A) may remain available for refueling operations. One or more bridge conduits 57 (also shown in FIG. 6) may be provided for fluidly connecting fuel conduits 52 on one side of the fuel system to fuel conduits 52 on the other side of the fuel system so as to enable filling of the fuel tanks 24 from both sides, as discussed above.

In exemplary embodiments, the fuel storage tanks 24 contain compressed natural gas that may be pressurized to about 3,000 psi or greater, such as about 4,000 psi to 4,700 psi, or more. The fuel storage tanks 24 may therefore be configured as pressure vessels having sufficient strength to contain the pressurized gas. For example, the pressure vessels may be formed as an all-metal construction, a mostly metal construction with fiber-reinforced overwrap, a metal liner with full fiber-reinforced composite overwrap for carrying most of the load, a metal-free construction with plastic liner and full fiber-reinforced composite overwrap, or an all fiber-reinforced composite construction that is liner-free.

In exemplary embodiments, the gaseous fuel is supplied to the prime mover 60, such as the engine, at a pressure level of about 50-500 psi, more preferably at about 100-200 psi. At least one pressure regulator 58 may be provided in the fuel system 50 to reduce the fuel pressure from the storage tanks 24 to the prime mover(s) 60. The fuel system 50 also may include electronic shut-off valves in the fuel conduits (e.g., 44, 52) or operatively coupled to each tank inlet/outlet port (e.g., 54a, 54b). The electronic shut-off valves may be automatically or manually operable by a controller that may monitor system conditions (such as pressure levels, temperature, gas levels in the ambient air due to leakage, and other such conditions) via one or more sensors. An alert system also may be provided based on the monitoring of such system conditions. For example, the system may include gaseous fuel detection sensor(s) to provide an audible or visual alert when an elevated level of gaseous fuel in the air is detected.

In the illustrated embodiment, the fuel supply system 50 is shown as forming part of the fuel deck 14, however it is understood that the exemplary fuel supply system 50 may be used in other systems where it is desirable to provide faster refueling times of the gaseous fuel, such as by simultaneously utilizing the dual inlet/outlet ports of the fuel tanks, or where it is desirable to provide improved accessibility to refueling and/or distributing the gaseous fuel, such as by independently utilizing one inlet/outlet port versus the other. Such alternative systems may include the use of the fuel supply system 50 on separate tender cars, or other vehicles that are powered (at least partially) by the gaseous fuel. It is also understood that although the fuel tanks 24 may contain compressed natural gas as the fuel, which remains gaseous in the compressed state as stored, other forms of low-energy-dense gaseous fuels may be used. For example, the fuel tanks may store liquid propane, liquefied natural gas, hydrogen, or other such gaseous fuels, which may be stored in a liquid state but are gaseous at standard temperature and pressure.

Figure 9:
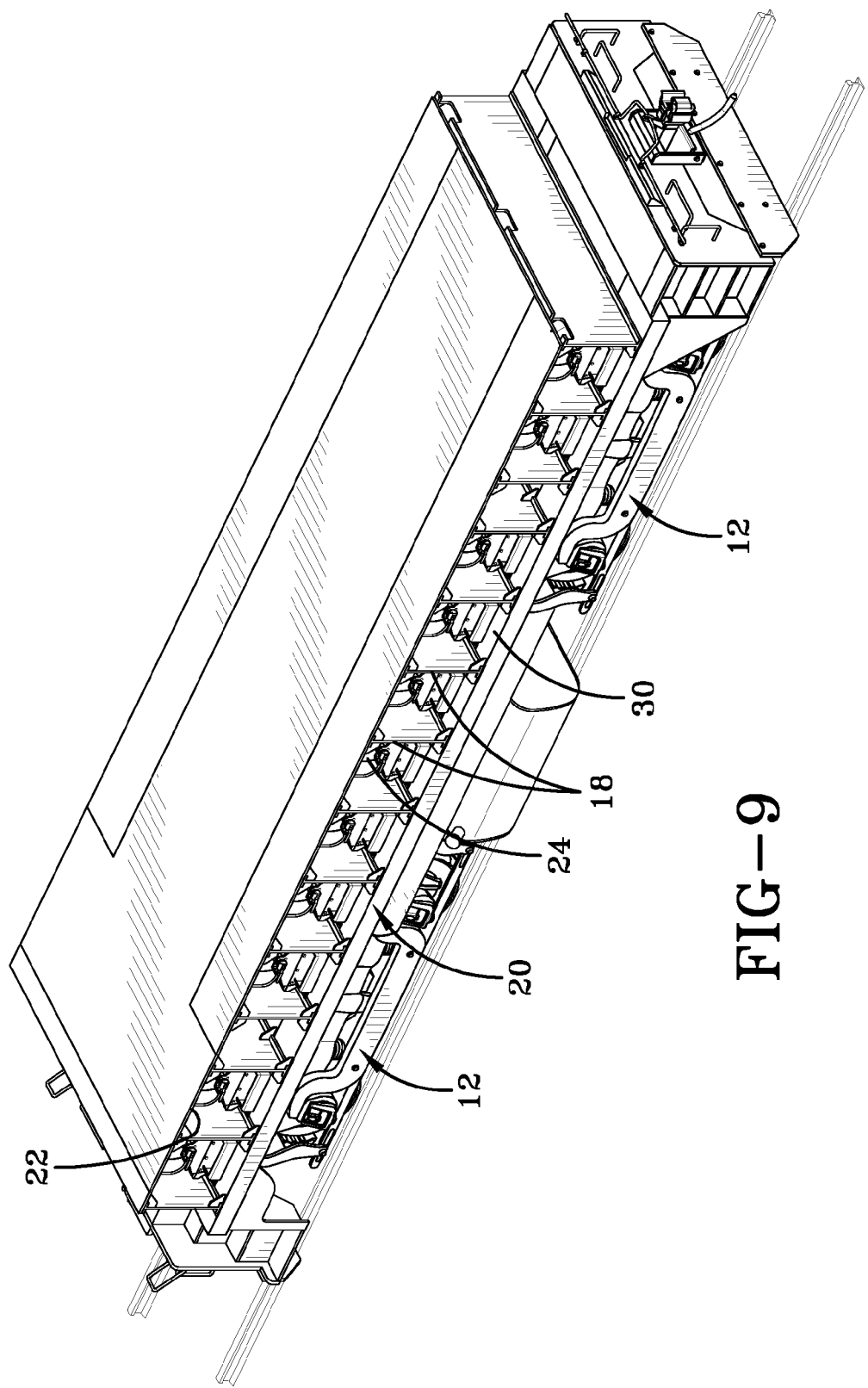
FIG. 9 is a perspective view of a portion of the locomotive in FIG. 7, with the addition of a fuel deck ceiling.

Turning to FIG. 9, the ceiling 22 of the fuel deck 14 is disposed on the one or more support structures 18 to enclose the fuel storage compartment, including each fuel storage bay 30. The ceiling 22 is configured to separate the fuel deck 14 from the engine deck 16, and should have sufficient thickness and/or strength to support load from the power-generation components contained in the engine deck 16. In some embodiments, the ceiling 22 has a first side that opposes the base 20 and an opposite side that forms a floor of the engine deck 16. In other embodiments, the floor of the engine deck 16 may be mounted to the ceiling 22 of the fuel deck 14.

In exemplary embodiments, the ceiling 22 may have a sealant, such as a coating, so as to prevent leaked gas from the storage tanks 24 from passing into the engine deck 16. The ceiling 22 also may have through-passages for enabling one or more fuel conduits from the fuel system 50 to fluidly connect to the prime mover(s) contained in the engine deck 16. The ceiling through-passages also may be provided for hoses, wiring, and other similar utilities. These through-passages also may be thoroughly sealed so as to prevent leaked fuel from passing into the engine deck 16. As discussed above, the exemplary design provided by the fuel storage bays 30 opening toward the lateral sides, and in which the bays 30 communicate with each other via cut-outs 32, may provide suitable venting so as to reduce regions of the fuel deck 14 where lighter-than-air fuel could become trapped and concentrated. The removable access panels 31 or other regions of the fuel deck 14 may have openings to further enable suitable venting to occur.

Figure 10:
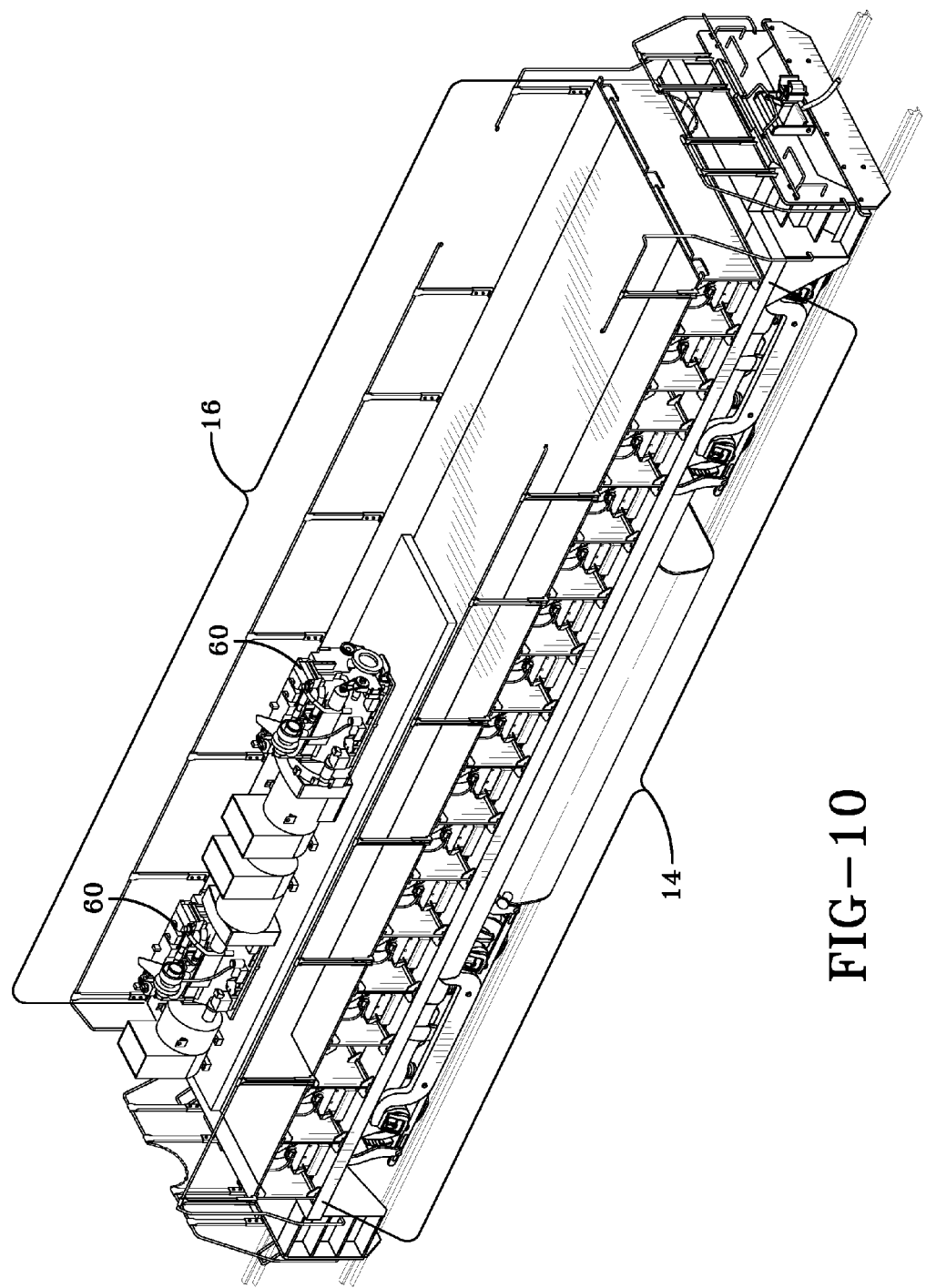
FIG. 10 is a perspective view of a portion of the locomotive in FIG. 9, with the addition of prime movers disposed on an engine deck.

Referring to FIG. 10, one or more prime movers 60 are disposed on the engine deck 16. In exemplary embodiments, the prime mover 60 includes an engine that is powered by the gaseous fuel contained in the fuel storage tanks 24. The term "powered by" as used herein means that the engine may be wholly powered by the gaseous fuel, or may be partially powered by the gaseous fuel, such as in combination with diesel or other liquid fuel. In a known-manner, the engines may be operatively coupled to one or more electrical generators, which may provide alternating current or direct current to the traction motors in the truck assemblies, which transmit power to the wheels. Alternatively or additionally, the engines may be operatively coupled to a hydraulic system for torque transmission and/or for enabling energy recuperation.

Figure 11:
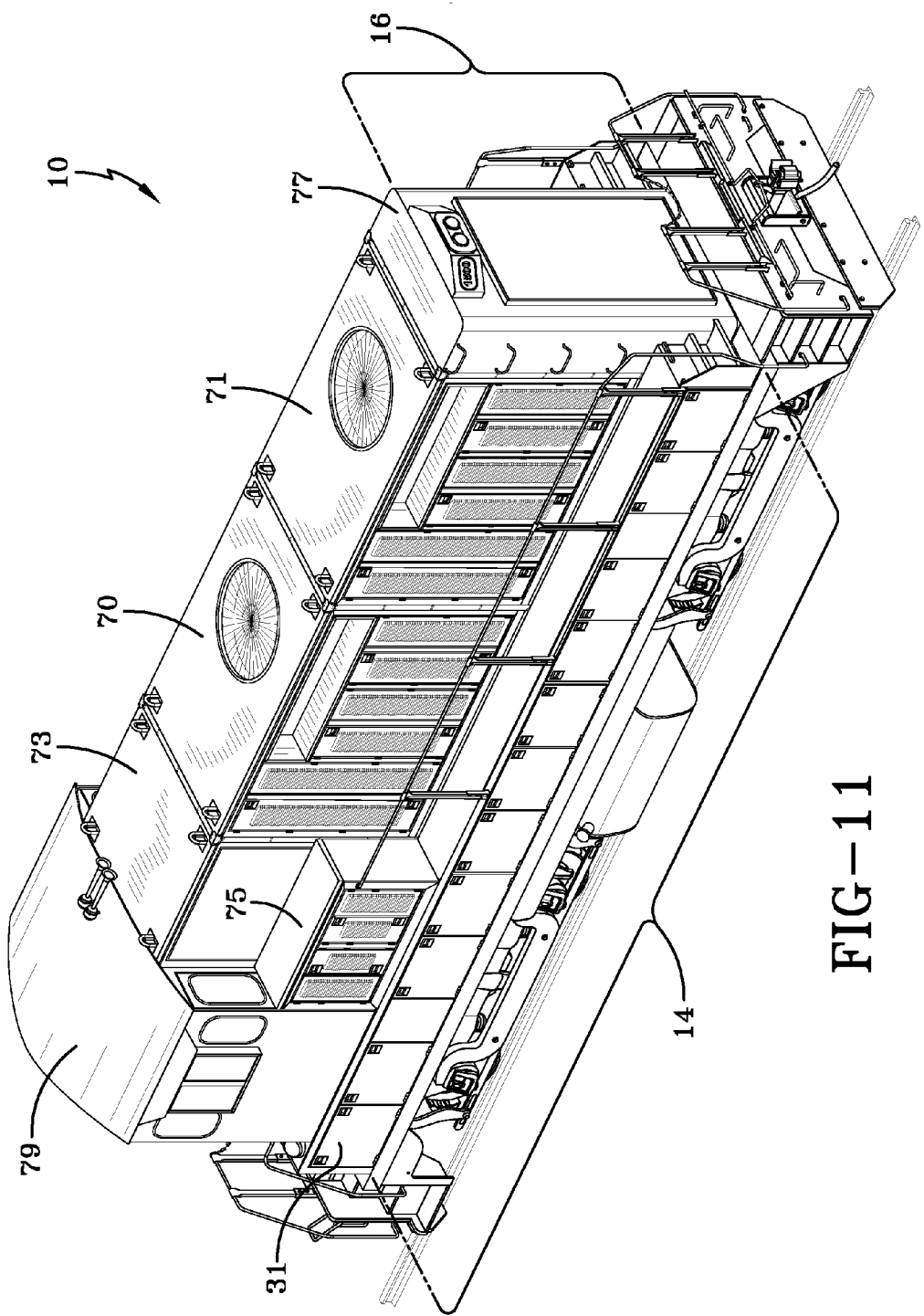
FIG. 11 is a perspective view of the assembled locomotive in FIG. 1.

Referring to FIG. 11 and also back to FIG. 1, the engine deck 16 also may include other power-generation equipment, which may be contained in one or more modules. For example, in the illustrated embodiment, the engine deck 16 includes two power modules 70, 71 that each contain a prime mover 60, such as the engine powered by the gaseous fuel, which may be a diesel-electric or diesel-hydraulic engine adapted to be powered by natural gas, for example. An electronics module 73 may include one or more electrical generators powered by the engine(s), such as one or more alternators that produce alternating current for powering the traction motors. A compressor module 75 may be provided for braking or other purpose. An end cap module 77 also may be provided. A cab 79 also may be disposed on the engine deck 16 containing the controls for operating the locomotive 10.

In exemplary embodiments, the locomotive 10 is configured as a switcher locomotive that operates on a switcher line for moving and assembling or disassembling railroad cars in the train consist. The switcher locomotive typically operates over shorter distances, and the exemplary fuel deck 14 may be configured to store sufficient gaseous fuel to enable the switcher locomotive to operate between regular refueling intervals without a separate tender car coupled to the switcher locomotive.

In exemplary embodiments, the fuel deck 14 may be formed as a modular unit that is mountable between the one or more trucks 12 and the engine deck 16. In this manner, the modular fuel deck unit may be formed by mounting at least one support structure to a base to form at least one fuel storage bay. The modular fuel deck unit may then be disposed on the trucks, or undercarriage carried by trucks, and then the engine deck may be disposed on top of the modular fuel deck unit. Optionally, the modular fuel deck unit may include at least one fuel tank disposed in the at least one fuel storage bay and/or fuel conduits for fluidly connecting the fuel tanks; however, the fuel tanks and/or fuel conduits may be installed after installation of the modular fuel deck unit. Optionally, the modular fuel deck unit may include the ceiling; however, the ceiling of the modular fuel deck unit may be installed after the installation of the modular fuel deck unit, or may be formed by the floor of the engine deck when the engine deck is mounted to the fuel deck.

In exemplary embodiments, the fuel deck 14 may be used for retrofitting pre-existing locomotives. For example, a pre-existing locomotive having an engine deck and trucks may be sectioned to remove the engine deck from the trucks. The fuel deck 14 may then be formed on the trucks, or undercarriage carried by the trucks, or may be mounted as a modular unit as discussed above. The pre-existing engine deck may then be mounted on top of the newly formed fuel deck 14.

As described herein, a fuel deck for on-board storage and delivery of gaseous fuel for a locomotive is provided. The fuel deck is formed between the engine deck and the trucks of the locomotive. The fuel deck includes a base for riding on the trucks, a ceiling configured to separate the fuel deck from the engine deck, and one or more support structures extending between the base and the ceiling. The support structures are configured to support the load from the engine deck, and separate the base from the ceiling to form a fuel storage compartment that is adapted to store one or more fuel tanks that contain the gaseous fuel.

The fuel deck may provide such on-board storage and delivery of gaseous fuel while enabling convenient installation, locating and securing of the storage tanks for long-term operation in high-vibration and transient environments, while also enhancing the ease of inspection and maintenance of the fuel system.

The fuel deck may form a self-contained enclosure that completely separates the trucks (or existing undercarriage) from the engine deck, and may support all of the load of the engine deck. The gaseous fuel storage for the locomotive may be completely contained within the fuel deck area. The fuel deck may provide secure containment of the gaseous fuel storage containers, and may be placed low in the locomotive to enhance crash-worthiness. Further provisions may be provided in the fuel deck to enhance venting of leaked gas to the atmosphere, to prevent leaked gas from entering the engine deck, and/or for taking measures when leaked gas is detected.

A fuel system is also provided, which includes one or more storage tanks for containing gaseous fuel, where each storage tank may have more than one inlet/outlet port. For example, each fuel storage tank, or pressure vessel, may have inlet/outlet ports at both ends for enabling simultaneous refilling or distribution from both ends, or independent filling or distribution from one end or the other. Such a fuel system may enable faster refueling times of the one or more storage tanks containing the gaseous fuel, or may enhance the accessibility of the pressure vessels for refueling from one side or the other.

According to one aspect, a system is provided for on-board storage and delivery of gaseous fuel for a locomotive.

Embodiments of the invention may include one or more of the following features, alone or in combination.

The gaseous fuel storage may be sufficient to allow locomotive operations to maintain typical liquid refueling intervals.

The gaseous fuel storage may be located within a complete fuel deck area immediately above the main locomotive frame.

The fuel deck may provide all of the necessary structure to support an engine deck directly above it within the locomotive.

The system may provide for the secure containment of gaseous fuel storage pressure vessels.

The system may include all rigid and/or flexible piping necessary for delivery of the gaseous fuel to required locations within the locomotive.

The system may provide for the pressure regulation of gaseous fuel for delivery to the prime mover.

The system may provide for automatic release to the atmosphere of gaseous fuel should leakage or other such conditions occur.

The system may include automatic electronic shutoff valves on each fuel tank that can be actuated by a control system.

The system may be designed so as to prevent the trapping of any lighter-than-air gaseous fuel within the structure if such fuel was to leak from the fuel system.

The system may provide a sealed ceiling, or engine floor, so as to prevent any upward incursion of light-than-air gaseous fuel into the engine deck.

The system may include gaseous fuel detection sensor(s) to detect elevated levels of the gaseous fuel in the air.

The system may include each gaseous fuel tank mounted in a movable tray structure so as to facilitate tank installation, removal and/or inspection of the tanks.

According to an aspect of the invention, a fuel deck for on-board storage and delivery of gaseous fuel for a locomotive, the locomotive having one or more trucks and an engine deck containing one or more engines powered by the gaseous fuel, the fuel deck configured to be interposed between the engine deck and the one or more trucks, the fuel deck including: a base configured to ride on the one or more trucks; a ceiling opposing the base and configured to separate the fuel deck from the engine deck; and at least one support structure extending between the base and the ceiling; wherein the at least one support structure is configured to support load from the engine deck; and wherein the at least one support structure is configured to separate the base from the ceiling to form a fuel storage compartment therebetween that is adapted to store one or more storage tanks for storing the gaseous fuel.

Embodiments of the invention may include one or more of the following additional features separately or in combination.

The base may have lateral sides and may extend longitudinally across two or more trucks.

The fuel deck may include a plurality of support structures, and each of the plurality of support structures may extend laterally across the base.

Each of the plurality of support structures may be longitudinally spaced apart from each other along the base to form one or more fuel storage bays that open toward at least one lateral side of the base, the one or more fuel storage bays being configured to receive the one or more storage tanks.

Each of the plurality of supports structures may be configured as a wall for separating the one or more storage tanks.

The at least one support structure may extend vertically upright or at an angle relative to the base.

The at least one support structure may be a unitary or sectional frame.

The base may be made of steel, and the at least one support structure may be welded to the steel base.

The fuel deck may be provided combination with a plurality of the one or more storage tanks.

Each of the one or more storage tanks may have an inlet/outlet port at an end portion thereof.

Each of the one or more storage tanks may be laterally disposed in the fuel storage compartment such that the respective inlet/outlet ports face outwardly toward one or more lateral sides of the base.

Each of the one or more storage tanks may have mounting bosses on opposite sides thereof.

Each of the one or more storage tanks may be a reinforced pressure vessel for containing compressed natural gas.

The fuel deck may further include a fuel supply system for supplying the gaseous fuel from the one or more storage tanks to the one or more engines.

Each of the one or more storage tanks may have a first inlet/outlet port at one end portion thereof, and a second inlet/outlet port at a second opposite end portion thereof.

The fuel supply system may include fluid conduits that fluidly connect to both the first inlet/outlet port and the second/inlet outlet port for enabling simultaneous filling or discharge of the gaseous fuel, and/or for enabling independent filling or discharge of the gaseous fuel from the one end portion or the second opposite end portion of the one or more storage tanks.

The fuel supply system may include rigid and/or flexible fluid conduits, also referred to as fuel conduits.

One or more of the fuel conduits may be mounted to the ceiling, the base, and/or the support structure of the fuel deck, such as with isolation bearings.

The fuel deck may further include one or more cradles, where each of the one or more cradles is configured to carry one or more of the storage tanks.

Each of the one or more cradles may include mounts at each end portion thereof, the mounts being configured to receive corresponding mounting bosses disposed on opposite ends of the respective one or more storage tanks.

Each of the one or more cradles may be mounted to the base, or to one or more support members, with at least one damping member interposed therebetween.

Each of the one or more cradles may be slidably disposed in the fuel storage compartment for enabling the one or more cradles to slide laterally outwardly to facilitate inspection, maintenance, and/or replacement.

The fuel deck may further include sliding rails mounted laterally with respect to the base, and each of the one or more cradles may be slidably disposed on the sliding rails for enabling the cradles to slide laterally outwardly to facilitate inspection, maintenance, and/or replacement of the one or more storage tanks.

The base may form an undercarriage of the locomotive.

One or more diesel tanks may be mountable to the underside of the undercarriage between the one or more trucks.

The ceiling of the fuel deck may have an opposite side that forms a floor of the engine deck.

The ceiling of the fuel deck may be sealed so as to restrict leaked gas from the one or more storage tanks from passing into the engine deck.

The fuel deck may be formed as a modular unit that is mountable between the one or more trucks and the engine deck of the locomotive.

The fuel deck may include one or more removable access panels for facilitating inspection and maintenance of storage containers.

The fuel deck may be provided in combination with the locomotive.

The locomotive may be configured as a switcher locomotive.

The fuel deck may be adapted to store sufficient gaseous fuel to enable the locomotive to operate between regular refueling intervals without a tender car coupled to the locomotive.

The one or more storage tanks may be pressure vessels.

The pressure vessels may be configured to contain compressed natural gas.

According to another aspect of the invention, a fuel system for supplying fuel to a locomotive having at least one engine powered by gaseous fuel, the fuel system including: at least one fuel storage tank for storing the gaseous fuel; and a plurality of fluid conduits for delivering the gaseous fuel from the at least one fuel storage tank to the at least one engine; wherein the at least one fuel storage tank has a first end portion having a first inlet/outlet port, and a second opposite end portion having a second inlet/outlet port; and wherein the plurality of fluid conduits is configured to fluidly connect both the first inlet/outlet port and the second/inlet outlet port for enabling simultaneous filling or discharge of the gaseous fuel.

Embodiments of the invention may include one or more of the following additional features separately or in combination.

At least a portion of the plurality of fluid conduits may be disposed in a fuel deck that contains the at least one fuel storage tank.

The fuel deck may be configured to be interposed between an engine deck of the locomotive and one or more trucks of the locomotive.

The fuel deck may include one or more of the aforementioned features.

The fuel system may be located on a switcher locomotive.

The fuel system may be located on a tender car coupled to the locomotive.

At least one fuel storage tank may be configured as a pressure vessel for containing compressed natural gas.

According to another aspect of the invention, a method of forming a fuel deck for the storage and delivery of gaseous fuel for a locomotive, the method including: (i) disposing a base on at least two trucks, such that the base extends longitudinally across the at least two trucks; (ii) mounting at least one support structure to the base, such that the at least one support structure extends upright from the base and forms at least one fuel storage bay; (iii) disposing at least one fuel tank for storing gaseous fuel in the at least one fuel storage bay; (iv) disposing an engine deck on the at least one support structure, the engine deck configured to contain at least one engine for being powered by the gaseous fuel, wherein the at least one support structure is configured to carry the load of the engine deck; and (v) mounting fuel conduits for fluidly connecting the at least one fuel tank to the at least one engine.

Embodiments of the invention may include one or more of the following additional features separately or in combination.

The at least one support structure may include a plurality of support structures.

The step of mounting the at least one support structure may include mounting the plurality of support structures to the base, such that each of the plurality of support structures extends laterally across the base, and such that the plurality of support structures are longitudinally spaced apart from each other along the base to form a plurality of fuel storage bays that open toward at least one lateral side of the base.

The at least one fuel tank may include a plurality of fuel tanks.

The step of disposing the at least one fuel tank may include disposing the plurality of fuel tanks amongst the plurality of fuel storage bays such that the plurality of fuel tanks extend laterally within the respective fuel storage bays.

The fuel storage tanks may be configured as pressure vessels for containing compressed natural gas.

The steps of: (ii) mounting the at least one support structure to the base, (iii) disposing the at least one fuel tank in the at least one fuel storage bay, and (v) mounting the fuel conduits, may be done together to form a modular fuel deck unit.

The modular fuel deck unit may be formed before the steps of: (i) disposing the base on the at least two trucks, and (iv) disposing the engine deck on the at least one support structure, such that: the step of disposing the base on the at least two trucks includes disposing the modular fuel deck unit on the at least two trucks; and the step of disposing the engine deck on the at least one support structure includes disposing the engine deck on the modular fuel deck unit.

According to another aspect of the invention, a method of retrofitting a pre-existing locomotive with a fuel deck for the storage and delivery of gaseous fuel, where the pre-existing locomotive includes at least two trucks and an engine deck riding on the at least two trucks, the engine deck containing at least one engine for being powered by the gaseous fuel, the method including: removing the engine deck from the at least two trucks; and forming the fuel deck for the storage and delivery of gaseous fuel according to any of the aforementioned features of the fuel deck, where: the step of disposing the base on the at least two trucks may include disposing the base on the at least two trucks of the pre-existing locomotive; and the step of disposing the engine deck on the at least one support structure may include disposing the engine deck of the pre-existing locomotive on the at least one support structure.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fuel deck for on-board storage and delivery of gaseous fuel for a locomotive, the locomotive having one or more trucks and an engine deck containing one or more engines powered by the gaseous fuel, the fuel deck configured to be interposed between the engine deck and the one or more trucks, the fuel deck comprising:
a base configured to ride on the one or more trucks;
a ceiling opposing the base and configured to separate the fuel deck from the engine deck; and
at least one support structure extending between the base and the ceiling;
wherein the at least one support structure is configured to support load from the engine deck; and
wherein the at least one support structure is configured to separate the base from the ceiling to form a fuel storage compartment therebetween that is adapted to store one or more storage tanks for storing the gaseous fuel.

2. The fuel deck according to claim 1, wherein the base has lateral sides and extends longitudinally across two or more trucks;
wherein the fuel deck includes a plurality of support structures, each of the plurality of support structures extending laterally across the base; and
wherein each of the plurality of support structures is longitudinally spaced apart from each other along the base to form one or more fuel storage bays that open toward at least one lateral side of the base, the one or more fuel storage bays being configured to receive the one or more storage tanks.

3. The fuel deck according to claim 1, in combination with a plurality of the one or more storage tanks;
wherein each of the plurality of storage tanks have an inlet/outlet port at an end portion thereof; and
wherein each of the plurality of storage tanks are laterally disposed in the fuel storage compartment such that the respective inlet/outlet ports face outwardly toward one or more lateral sides of the base.

4. The fuel deck according to claim 1, in combination with the one or more storage tanks;
wherein each of the one or more storage tanks has a first port at one end portion thereof, and a second port at a second opposite end portion thereof; and
wherein the fuel deck further includes a fuel supply system, the fuel supply system including fluid conduits that fluidly connect to both the first port and the second port for enabling simultaneous filling or discharge of the gaseous fuel, or for enabling independent filling or discharge of the gaseous fuel from the one end portion or the second opposite end portion of the one or more storage tanks.

5. The fuel deck according to claim 1, further including one or more cradles, wherein each of the one or more cradles is configured to carry one or more of the storage tanks.

6. The fuel deck according to claim 5, wherein each of the one or more cradles includes mounts at each end portion thereof, the mounts being configured to receive corresponding mounting bosses disposed on opposite ends of the respective one or more storage tanks.

7. The fuel deck according to claim 5, wherein each of the one or more cradles is mounted to the base, or to one or more support members, with at least one damping member interposed therebetween.

8. The fuel deck according to claim 1, wherein the base forms an undercarriage of the locomotive, and wherein one or more diesel tanks are mountable to the underside of the undercarriage between the one or more trucks.

9. The fuel deck according to claim 1, wherein the ceiling of the fuel deck has an opposite side that forms a floor of the engine deck, the ceiling being sealed so as to restrict leaked gas from the one or more storage tanks from passing into the engine deck.

10. The fuel deck according to claim 1, wherein the fuel deck is formed as a modular unit that is mountable between the one or more trucks and the engine deck of the locomotive.

11. The fuel deck according to claim 1, in combination with the locomotive, wherein the locomotive is configured as a switcher locomotive, and wherein the fuel deck is adapted to store sufficient gaseous fuel to enable the switcher locomotive to operate between regular refueling intervals without a tender car coupled to the switcher locomotive.

12. The fuel deck according to claim 1, wherein the one or more storage tanks are pressure vessels containing compressed natural gas.

13. A method of forming a fuel deck for the storage and delivery of gaseous fuel for a locomotive, the method comprising:
    disposing a base on at least two trucks, such that the base extends longitudinally across the at least two trucks;
    mounting at least one support structure to the base, such that the at least one support structure extends upright from the base and forms at least one fuel storage bay;
    disposing at least one fuel tank for storing gaseous fuel in the at least one fuel storage bay;
    disposing an engine deck on the at least one support structure, the engine deck configured to contain at least one engine for being powered by the gaseous fuel, wherein the at least one support structure is configured to carry the load of the engine deck; and
    mounting fuel conduits for fluidly connecting the at least one fuel tank to the at least one engine.

14. The method of claim 13, wherein the at least one support structure includes a plurality of support structures, and the step of mounting the at least one support structure includes mounting the plurality of support structures to the base, such that each of the plurality of support structures extends laterally across the base, and such that the plurality of support structures are longitudinally spaced apart from each other along the base to form a plurality of fuel storage bays that open toward at least one lateral side of the base; and
    wherein the at least one fuel tank includes a plurality of fuel tanks, and the step of disposing the at least one fuel tank includes disposing the plurality of fuel tanks amongst the plurality of fuel storage bays such that the plurality of fuel tanks extend laterally within the respective fuel storage bays; and
    wherein the fuel storage tanks are configured as pressure vessels for containing compressed natural gas.

15. The method according to claim 13, wherein the steps of: (i) mounting the at least one support structure to the base, (ii) disposing the at least one fuel tank in the at least one fuel storage bay, and (iii) mounting the fuel conduits, are done together to form a modular fuel deck unit, where the modular fuel deck unit is formed before the steps of disposing the base on the at least two trucks and disposing the engine deck on the at least one support structure, such that:
    the step of disposing the base on the at least two trucks includes disposing the modular fuel deck unit on the at least two trucks; and
    the step of disposing the engine deck on the at least one support structure includes disposing the engine deck on the modular fuel deck unit.

16. A method of retrofitting a pre-existing locomotive with a fuel deck for the storage and delivery of gaseous fuel, where the pre-existing locomotive includes at least two trucks and an engine deck riding on the at least two trucks, the engine deck containing at least one engine for being powered by the gaseous fuel, the method comprising:
    removing the engine deck from the at least two trucks; and
    forming the fuel deck for the storage and delivery of gaseous fuel according to claim 13, wherein:
    the step of disposing the base on the at least two trucks includes disposing the base on the at least two trucks of the pre-existing locomotive; and
    the step of disposing the engine deck on the at least one support structure includes disposing the engine deck of the pre-existing locomotive on the at least one support structure.

* * * * *